(12) United States Patent
Koo et al.

(10) Patent No.: US 10,766,001 B2
(45) Date of Patent: Sep. 8, 2020

(54) AERATOR APPARATUS AND AIR DIFFUSION APPARATUS COMPRISING SAME

(71) Applicant: LOTTE CHEMICAL CORPORATION, Seoul (KR)

(72) Inventors: Young Lim Koo, Daejeon (KR); Hyung Wook Ahn, Daejeon (KR); Gyu Hong Min, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 223 days.

(21) Appl. No.: 15/764,141

(22) PCT Filed: Sep. 30, 2016

(86) PCT No.: PCT/KR2016/010938
§ 371 (c)(1),
(2) Date: Mar. 28, 2018

(87) PCT Pub. No.: WO2017/057935
PCT Pub. Date: Apr. 6, 2017

(65) Prior Publication Data
US 2018/0272282 A1    Sep. 27, 2018

(30) Foreign Application Priority Data
Sep. 30, 2015 (KR) .......... 10-2015-0137971

(51) Int. Cl.
*B01D 65/02* (2006.01)
*B01D 61/08* (2006.01)
(Continued)

(52) U.S. Cl.
CPC ............ *B01D 61/08* (2013.01); *B01D 61/20* (2013.01); *B01D 65/08* (2013.01); *C02F 1/44* (2013.01);
(Continued)

(58) Field of Classification Search
CPC ........ B01D 61/08; B01D 61/20; B01D 65/02; B01D 65/08; B01D 2313/26;
(Continued)

(56) References Cited

U.S. PATENT DOCUMENTS 4,187,263 A * 2/1980 Lipert ................. C02F 3/20
137/209
8,038,882 B2   10/2011 Hashimoto
(Continued)

FOREIGN PATENT DOCUMENTS

CN    202156951 U    3/2012
JP    2009-183939 A  8/2009
(Continued)

OTHER PUBLICATIONS

International Search Report issued in PCT/KR2016/010938 dated Jan. 10, 2017 (4 pages).
(Continued)

Primary Examiner — Charles S Bushey
(74) Attorney, Agent, or Firm — Osha Liang LLP

(57) ABSTRACT

An aerator apparatus including a housing having an inner cavity formed therein, which includes at least one side wall and an upper surface portion connected to the at least one side wall. Additionally, the aerator apparatus includes a first partition wall formed inside the inner cavity and extends from a first lower end to a first upper end to form a first cavity portion and a second cavity portion. Furthermore, a second partition wall is formed between the first partition wall and the first side wall inside the inner cavity, and is extended from a second upper end to a second lower end to form a first chamber and a second chamber in the second cavity portion.

14 Claims, 10 Drawing Sheets

(51) Int. Cl.
*C02F 1/44* (2006.01)
*B01D 61/20* (2006.01)
*C02F 3/20* (2006.01)
*B01D 65/08* (2006.01)
*C02F 3/12* (2006.01)

(52) U.S. Cl.
CPC ............... *C02F 3/20* (2013.01); *B01D 65/02* (2013.01); *B01D 2313/26* (2013.01); *B01D 2315/06* (2013.01); *B01D 2321/185* (2013.01); *C02F 3/1273* (2013.01); *C02F 2303/16* (2013.01); *Y02W 10/15* (2015.05)

(58) Field of Classification Search
CPC . B01D 2315/06; B01D 2321/185; C02F 1/44; C02F 3/20; C02F 3/1273; C02F 2303/16; Y02W 10/15
USPC ................................ 261/77, 121.1, 123, 126
See application file for complete search history.

(56) References Cited

U.S. PATENT DOCUMENTS 8,876,089 B2 * 11/2014 Garrioch ............. B01F 3/04241
261/122.1

2010/0300968 A1 * 12/2010 Liu ....................... B01D 61/18
210/636
2012/0285885 A1    11/2012 James et al.
2012/0325742 A1 * 12/2012 Cumin ................... B01D 61/08
210/636
2015/0265973 A1     9/2015 Phelps et al.

FOREIGN PATENT DOCUMENTS

| KR | 2014-0021481 A | 2/2014 |
| KR | 2015-0000238 A | 1/2015 |
| KR | 2015-0038566 A | 4/2015 |
| KR | 2015-0078946 A | 7/2015 |

OTHER PUBLICATIONS

Written Opinion issued in PCT/KR2016/010938 dated Jan. 10, 2017 (8 pages).

Extended European Search Report issued in corresponding European Application No. 16852081.5 dated Mar. 27, 2019 (9 pages).

* cited by examiner

[FIG. 1 (PRIOR ART)]
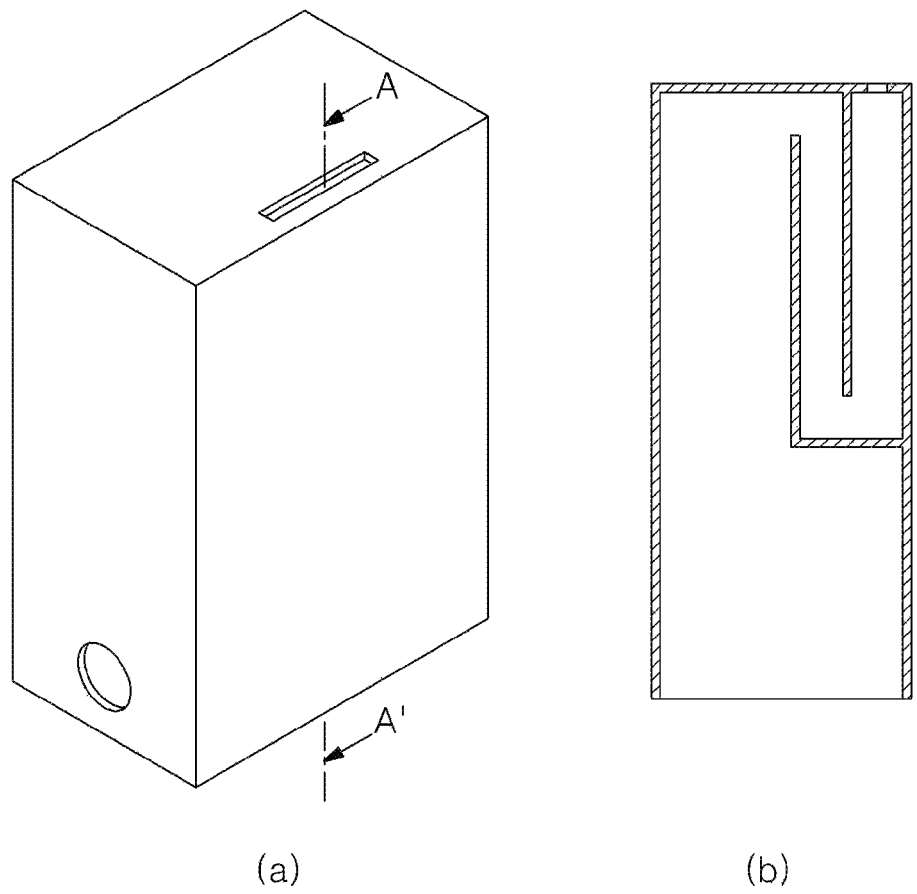

[FIG. 2]
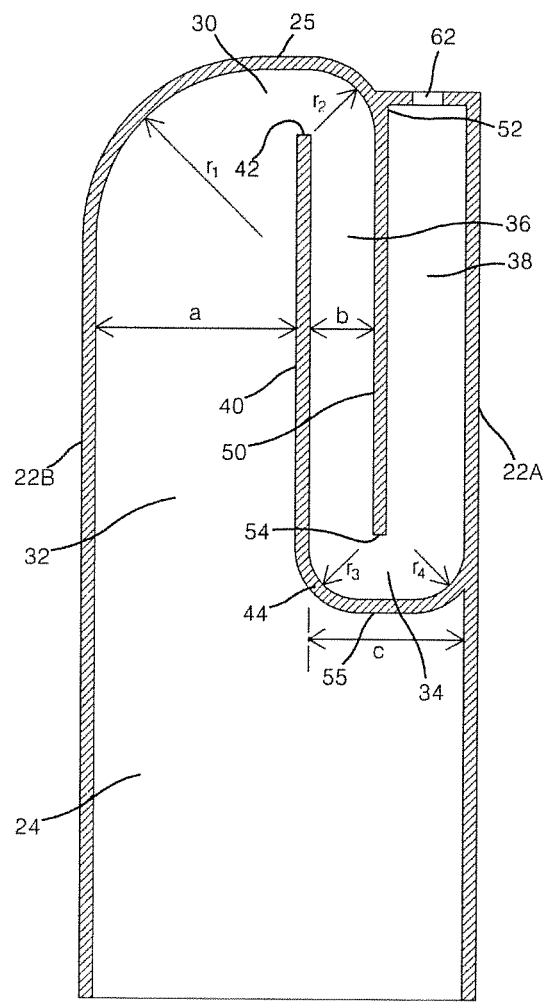

[FIG. 3]
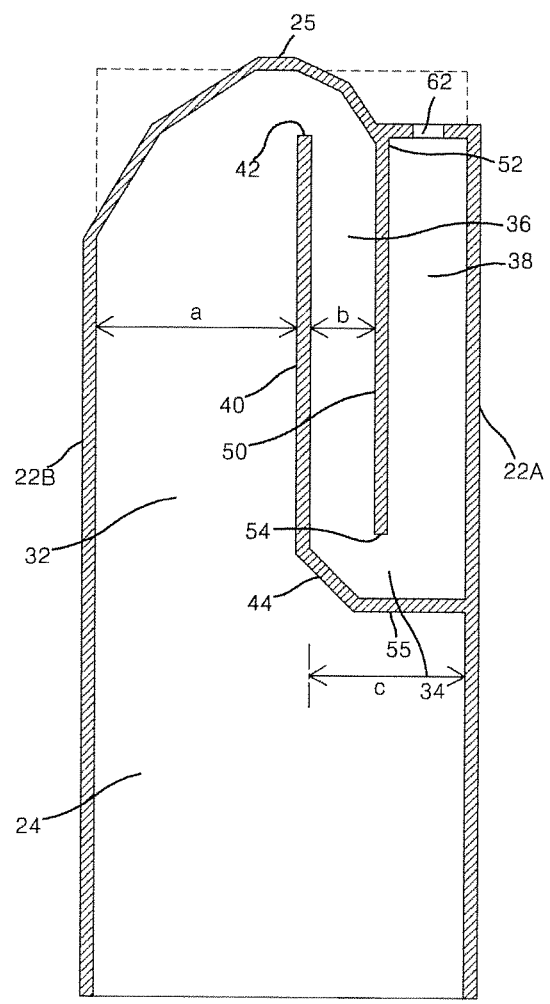

[FIG. 4]
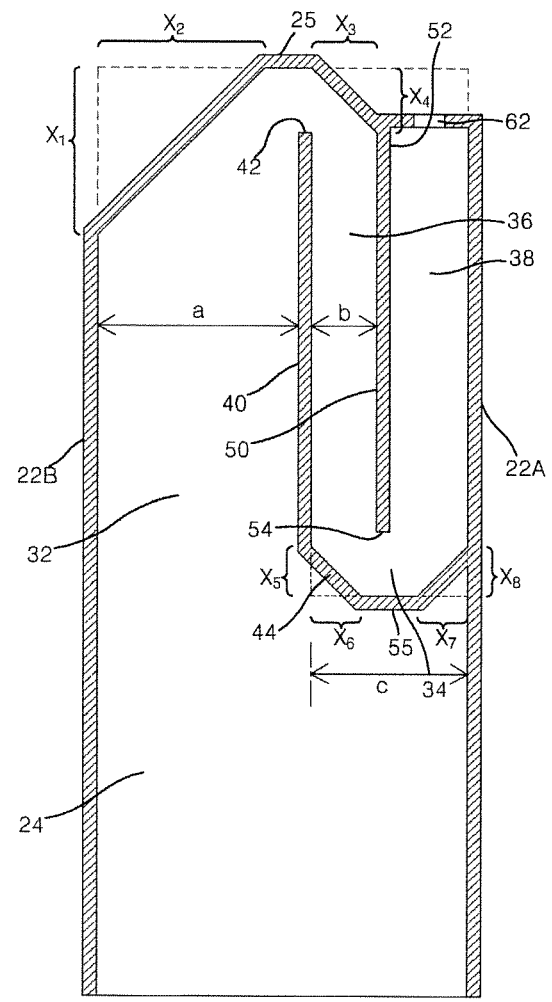

【FIG. 5】
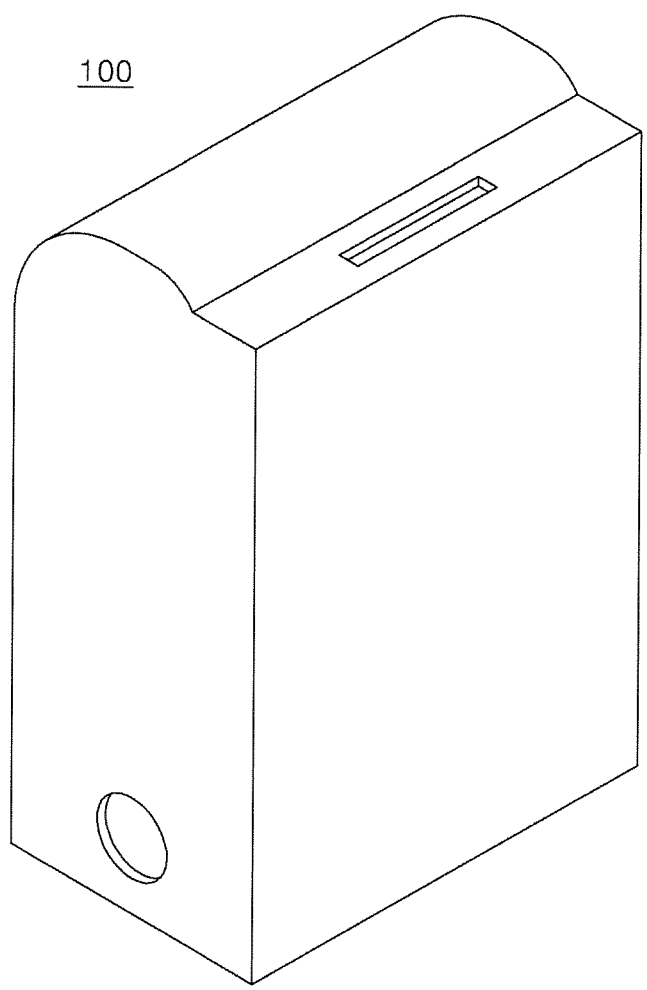

[FIG. 6]
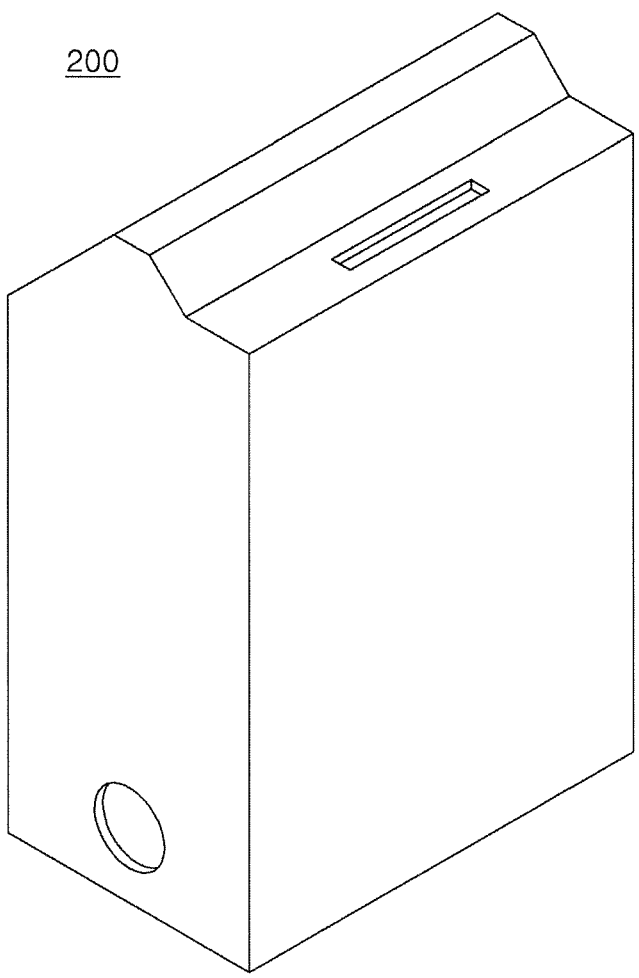

[FIG. 7]
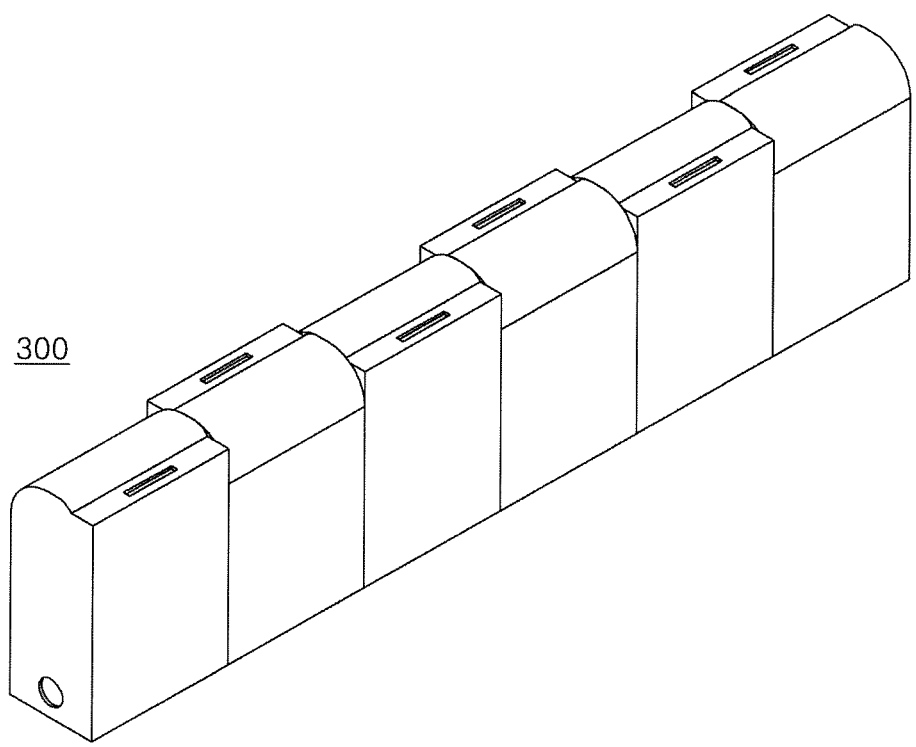
300

[FIG. 8]
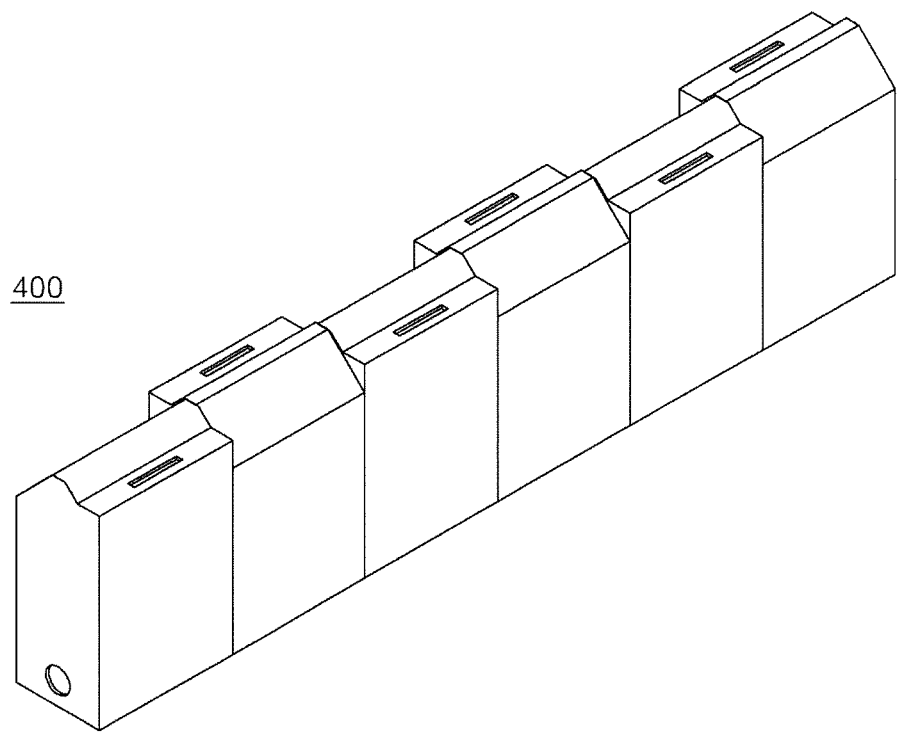
400

[FIG. 9]
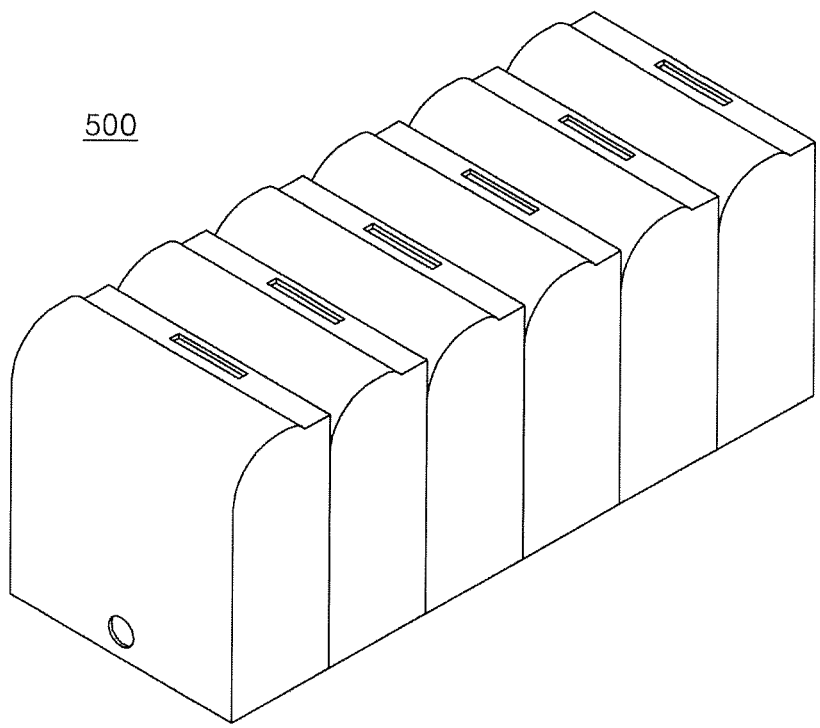

[FIG. 10]
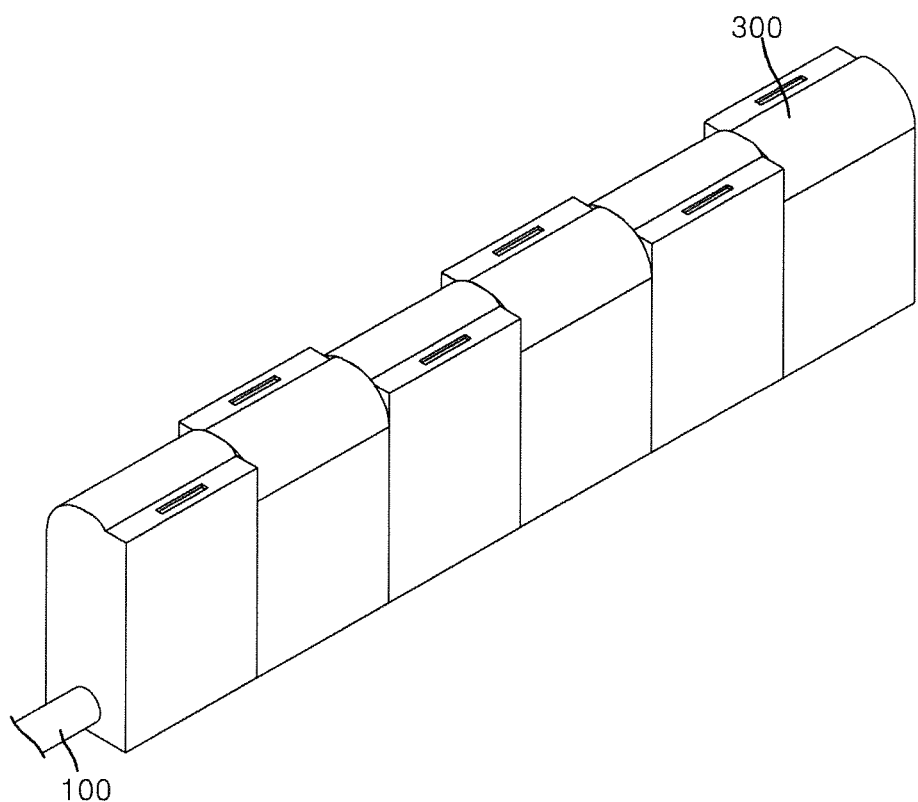

AERATOR APPARATUS AND AIR DIFFUSION APPARATUS COMPRISING SAME

CROSS-REFERENCE TO RELATED APPLICATIONS

This application is a National Stage application of International Patent Application No. PCT/KR2016/010938, filed on Sep. 30, 2016, which claims priority to Korean Patent Application No. KR 10-2015-0137971, filed on Sep. 30, 2015. Both applications are hereby incorporated by reference in their entirety.

TECHNICAL FIELD

The present invention relates to an aerator and an air diffuser including the same.

BACKGROUND ART

The surface of a submerged membrane module needs to be continuously decontaminated via aeration to prevent the contaminants adhered to the surface of the membrane in microbial reactor tank or a raw water tank from causing decrease in the filtration performance. For this purpose, an air diffuser including an air diffusion pipe is disposed under a membrane cassette to inject air, thereby cleaning the membrane. Generally, the air diffusion pipe has a circular tubular shape and includes a plurality of air diffusion holes formed at regular intervals to evenly distribute air throughout the membrane.

In order to improve cleaning efficiency, an attempt has been made to use an aerator which holds a certain amount of air discharged from an air diffusion pipe and discharges large bubbles at the same time (see FIG. 1). However, the aerator has a problem in that a vortex of air is generated at each corner of an airflow path (a first cavity, a first chamber, and a second chamber). Such a vortex of air interferes with air flow, such that the air cannot be discharged from the aerator at the same time. As a result, an initial discharge speed of air from the aerator is reduced, and large bubbles cannot be continuously discharged.

Therefore, there is a need for an aerator which can overcome such a problem, thereby providing improved cleaning efficiency.

The background technique of the present invention is disclosed in U.S. Pat. No. 8,038,882.

DISCLOSURE

Technical Problem

It is an object of the present invention to provide an aerator which can secure smooth air flow, high bubble discharge speed, and continuous discharge of large bubbles, thereby exhibiting improved cleaning efficiency, and an air diffuser including the same.

These and other objects of the present invention can be achieved by the following embodiments described below.

Technical Solution

In accordance with one aspect of the present invention, an aerator includes: a housing defining an inner cavity and including at least one side wall and an upper surface connected to the at least one side wall; a first partition formed in the inner cavity and extending from a first lower end to a first upper end to define a first cavity and a second cavity; and a second partition formed between the first partition and a first side wall in the inner cavity and extending from a second upper end to a second lower end to form a first chamber and a second chamber in the second cavity, wherein the housing includes an outlet communicating with the second chamber, the upper end of the first partition is spaced apart from the upper surface to form a first opening such that the first cavity communicates with the second cavity through the first opening, the at least one side wall comprises the first side wall and a second side wall opposite the first side wall, the first lower end of the first partition is connected to the first side wall through a lower surface, the second side wall is connected to the upper surface through a first connecting surface, the second partition is connected to the upper surface through a second connecting surface, the first chamber and the second chamber communicate with each other under the second lower end of the second partition, and at least one of the first connecting surface and the second connecting surface is a planar surface, a curved surface, or a polygonal surface.

The first connecting surface may be a curved surface, wherein the curved surface may have a minimum radius of curvature $r_1$ satisfying Equation 1:

$$\frac{a}{4} \leq r_1 \leq a \qquad \text{<Equation 1>}$$

where a denotes a distance between the second side wall and the first partition.

The second connecting surface may be a curved surface, wherein the curved surface may include a curved surface with a minimum radius of curvature $r_2$ satisfying Equation 2:

$$\frac{b}{3} \leq r_2 \leq b \qquad \text{<Equation 2>}$$

where b denotes a distance between the first partition and the second partition.

At least one of the first connecting surface and the second connecting surface may be a polygonal surface.

The first connecting surface may be a planar surface connecting the second side wall to the upper surface, wherein a distance $x_1$ between the second side wall and a point at which an extension of the second side wall joins an extension of the upper surface may satisfy Equation 3 and a distance $x_2$ between the upper surface and the point may satisfy Equation 4:

$$\frac{a}{4} \leq x_1 \leq a \qquad \text{<Equation 3>}$$

$$\frac{a}{4} \leq x_2 \leq a \qquad \text{<Equation 4>}$$

where a is a distance between the second side wall and the first partition.

The second connecting surface may be a planar surface connecting the upper surface to the second partition, wherein a distance $x_3$ between the upper surface and a point at which an extension of the upper surface joins an extension of the second partition may satisfy Equation 5 and a distance $x_4$ between the second partition and the point may satisfy Equation 6:

$$\frac{b}{3} \le x_3 \le b \qquad \text{<Equation 5>}$$

$$\frac{b}{3} \le x_4 \le b \qquad \text{<Equation 6>}$$

where b denotes a distance between the first partition and the second partition.

The first partition may be connected to the lower surface through a third connecting surface and the lower surface may be connected to the first side wall through a fourth connecting surface, wherein at least one of the third connecting surface and the fourth connecting surface may be a planar surface, a curved surface, or a polygonal surface.

The third connecting surface may be a curved surface, wherein the curved surface may have a minimum radius of curvature $r_3$ satisfying Equation 7, and the fourth connecting surface may be a curved surface, wherein the curved surface may have a minimum radius of curvature $r_4$ satisfying Equation 8:

$$\frac{c}{4} \le r_3 \le c \qquad \text{<Equation 7>}$$

$$0 \le r_4 \le \frac{3}{4}c \qquad \text{<Equation 8>}$$

where c denotes a distance between the first partition and the first side wall.

The third connecting surface may be a planar surface connecting the first partition to the lower surface, wherein a distance $x_5$ between the first partition and a point at which an extension of the first partition joins an extension of the lower surface may satisfy Equation 9 and a distance $x_6$ between the lower surface and the point may satisfy Equation 10, and the fourth connecting surface may be a planar surface connecting the lower surface to the first side wall, wherein a distance $x_7$ between the lower surface and a point at which an extension of the lower surface joins an extension of the first side wall may satisfy Equation 11 and a distance $x_8$ between the first side wall and the point may satisfy Equation 12:

$$\frac{c}{4} \le x_5 \le c \qquad \text{<Equation 9>}$$

$$\frac{c}{4} \le x_6 \le c \qquad \text{<Equation 10>}$$

$$0 \le x_7 \le \frac{3}{4}c \qquad \text{<Equation 11>}$$

$$0 \le x_8 \le \frac{3}{4}c \qquad \text{<Equation 12>}$$

where c denotes a distance between the first partition and the first side wall.

The housing may further include an inlet communicating with the first cavity.

The aerator may have at least two separated inner cavities.

In accordance with another aspect of the present invention, an air diffuser includes: the aerator as set forth above; and an air diffusion pipe discharging air through an air diffusion hole.

The air diffusion pipe may be placed in the first cavity of the housing such that air discharged through the air diffusion hole is discharged from the aerator through the outlet after sequentially passing through the first cavity, the first chamber, and the second chamber.

The aerator may further include an inlet communicating with the first cavity, and the air diffusion pipe may be inserted into the aerator through the inlet.

Advantageous Effects

The present invention provides an aerator which can secure smooth air flow, high bubble discharge speed, and continuous discharge of large bubbles, thereby exhibiting improved cleaning efficiency, and an air diffuser including the same.

DESCRIPTION OF DRAWINGS

FIG. 1 shows a schematic perspective view and a sectional view of a typical aerator.

FIG. 2 is a schematic sectional view of an aerator according to one embodiment of the present invention.

FIG. 3 is a schematic sectional view of an aerator according to another embodiment of the present invention.

FIG. 4 is a schematic sectional view of an aerator according to a further embodiment of the present invention.

FIG. 5 is a schematic perspective view of the aerator of FIG. 2.

FIG. 6 is a schematic perspective view of the aerator of FIG. 4.

FIG. 7 is a schematic perspective view of an aerator according to yet another embodiment of the present invention.

FIG. 8 is a schematic perspective view of an aerator according to yet another embodiment of the present invention.

FIG. 9 is a schematic perspective view of an aerator according to yet another embodiment of the present invention.

FIG. 10 is a schematic perspective view of an air diffuser according to one embodiment of the present invention.

BEST MODE

In order to more clearly describe the present invention, some terms will be used in the following senses.

As used herein, the term "housing" refers to a frame forming a structure of an aerator.

As used herein, the term "bubble speed" refers to a speed of bubbles immediately after being discharged from an aerator.

As used herein, the term "lower surface" refers to a portion connecting a first lower end of a first partition to a first side wall.

In the drawings, reference numeral 24 denotes a side wall parallel to the planes of the drawings, wherein the side wall may refer to one or both of opposite parallel side walls forming an inner cavity together with a first side wall 22A and a second side wall 22B.

Hereinafter, embodiments of the present invention will be described with reference to the accompanying drawings. It should be understood that the present invention may be embodied in different ways and is not limited to the following embodiments.

In addition, it should be understood that the embodiments are provided for complete disclosure and thorough understanding of the present invention by those skilled in the art. In the drawings, thicknesses or widths of various components of each device may be exaggerated for convenience. Further, although only a portion of a component is shown for convenience, the other portions of the component will be readily understood by those skilled in the art.

It will be understood that when an element is referred to as being placed "above"/"below" or "on"/"under" another element, it can be directly placed on the other element, or intervening element(s) may also be present. In addition, it should be understood that various modifications, changes, alterations, and equivalent embodiments can be made by those skilled in the art without departing from the spirit and scope of the invention. Like components will be denoted by like reference numerals throughout the specification.

As used herein, the singular forms, "a," "an," and "the" are intended to include the plural forms as well, unless context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Aerator

One aspect of the present invention relates to an aerator. Now, an aerator according to one embodiment of the present invention will be described with reference to FIGS. 2 to 6.

Referring to FIGS. 2 to 6, the aerator according to this embodiment of the present invention includes: a housing defining an inner cavity and including at least one side wall 22A, 22B, 24 and an upper surface 25 connected to the at least one side wall 22A, 22B, 24; a first partition 40 formed in the inner cavity and extending from a first lower end 44 to a first upper end 42 to define a first cavity 32 and a second cavity 34; and a second partition 50 formed between the first partition 40 and the first side wall 22A in the inner cavity and extending from a second upper end 52 to a second lower end 54 to form a first chamber 36 and a second chamber 38 in the second cavity 34, wherein the housing includes an outlet 62 communicating with the second chamber 38, the upper end of the first partition 40 is spaced apart from the upper surface 25 to form a first opening 30, such that the first cavity 32 communicates with the second cavity 34 through the first opening 30, the at least one side wall 22A, 22B, 24 includes the first side wall 22A and a second side wall 22B opposite the first side wall, the first lower end 44 of the first partition 40 is connected to the first side wall 22A through a lower surface 55, the second side wall 22B is connected to the upper surface 25 through a first connecting surface, the second partition 50 is connected to the upper surface 25 through a second connecting surface, the first chamber 36 and the second chamber 38 communicate with each other under the second lower end 54 of the second partition 50, and at least one of the first connecting surface and the second connecting surface is a planar surface, a curved surface, or a polygonal surface.

If the first connecting surface and the second connecting surface do not include a planar surface, a curved surface, or a polygonal surface, resistance to an air flow increases due to a vortex of air created at each corner of an air flow path (the first cavity, the first chamber, and the second chamber). As a result, air cannot be discharged from the aerator at the same time, such that an initial discharge speed of air from the aerator is reduced and large bubbles cannot be continuously discharged.

The aerator according to the present invention can prevent creation of a vortex of air at corners of the flow path, thereby securing smooth airflow, high bubble discharge speed, and continuous discharge of large bubbles, thereby exhibiting improved cleaning efficiency.

In one embodiment, at least one of the first connecting surface and the second connecting surface may include a curved surface.

Referring to FIG. 2 and FIG. 5., FIG. 2 is a schematic sectional view of an aerator in which at least one of the first and second connecting surfaces is a curved surface, and FIG. 5 is a schematic perspective view of the aerator 100 in which at least one of the first and second connecting surfaces is a curved surface.

For example, the first connecting surface may be a curved surface, wherein the curved surface may have a minimum radius of curvature $r_1$ satisfying Equation 1:

$$\frac{a}{4} \leq r_1 \leq a \qquad \text{<Equation 1>}$$

where a denotes a distance between the second side wall and the first partition.

Specifically, the minimum radius of curvature $r_1$ may be $$\frac{a}{3} \leq r_1 \leq a,$$

more specifically $$\frac{a}{2} \leq r_1 \leq a.$$

Within this range, the aerator can secure smooth airflow, thereby exhibiting high cleaning efficiency.

For example, the second connecting surface may be a curved surface, wherein the curved surface may have a minimum radius of curvature $r_2$ satisfying Equation 2:

$$\frac{b}{3} \leq r_2 \leq b \qquad \text{<Equation 2>}$$

where b denotes a distance between the first partition and the second partition.

Specifically, the minimum radius of curvature $r_2$ may be $$\frac{b}{2} \leq r_2 \leq b,$$

more specifically $$\frac{2b}{3} \leq r_2 \leq b.$$

Within this range, the aerator can secure smooth air flow, thereby exhibiting high cleaning efficiency.

In another embodiment, at least one of the first connecting surface and the second connecting surface may be a polygonal surface. FIG. 3 is a schematic sectional view of an aerator in which at least one of the first connecting surface and the second connecting surface is a polygonal surface.

In a further embodiment, at least one of the first connecting surface and the second connecting surface may be a planar surface.

Referring to FIG. 4 and FIG. 6, FIG. 4 is a schematic sectional view of an aerator in which at least one of the first connecting surface and the second connecting surface is a planar surface, and FIG. 6 is a schematic perspective view of the aerator 200 in which at least one of the first connecting surface and the second connecting surface is a planar surface.

For example, the first connecting surface may be a planar surface connecting the second side wall to the upper surface, wherein a distance $x_1$ between the second side wall and a point at which an extension of the second side wall joins an extension of the upper surface may satisfy Equation 3, and a distance $x_2$ between the upper surface and the point may satisfy Equation 4:

$$\frac{a}{4} \le x_1 \le a \qquad \text{<Equation 3>}$$

$$\frac{a}{4} \le x_2 \le a \qquad \text{<Equation 4>}$$

where a denotes a distance between the second side wall and the first partition.

Specifically, $x_1$ may be $$\frac{a}{3} \le x_1 \le a,$$

more specifically $$\frac{a}{2} \le x_1 \le a.$$

Within this range, the aerator can secure smooth air flow, thereby exhibiting high cleaning efficiency.

Specifically, $x_2$ may be $$\frac{a}{3} \le x_2 \le a,$$

more specifically $$\frac{a}{2} \le x_2 \le a.$$

Within this range, the aerator can secure smooth air flow, thereby exhibiting high cleaning efficiency.

For example, the second connecting surface may be a planar surface connecting the upper surface to the second partition, wherein a distance $x_3$ between the upper surface and a point at which an extension of the upper surface joins an extension of the second partition may satisfy Equation 5, and a distance $x_4$ between the second partition and the point may satisfy Equation 6:

$$\frac{b}{3} \le x_3 \le b \qquad \text{<Equation 5>}$$

$$\frac{b}{3} \le x_4 \le b \qquad \text{<Equation 6>}$$

where b denotes a distance between the first partition and the second partition.

Specifically, $x_3$ may be $$\frac{b}{2} \le x_3 \le b,$$

more specifically $$\frac{2b}{3} \le x_3 \le b.$$

Within this range, the aerator can secure smooth air flow, thereby exhibiting high cleaning efficiency.

Specifically, $x_4$ may be $$\frac{b}{2} \le x_4 \le b,$$

more specifically $$\frac{2b}{3} \le x_4 \le b.$$

Within this range, the aerator can secure smooth air flow, thereby exhibiting high cleaning efficiency.

In yet another embodiment, the first partition may be connected to the lower surface of the housing through a third connecting surface, and the lower surface may be connected to the first side wall through a fourth connecting surface, wherein at least one of the third connecting surface and the fourth connecting surface may be a planar surface, a curved surface, or a polygonal surface.

By way of one example, the third connecting surface may be a curved surface, wherein the curved surface may have a minimum radius of curvature $r_3$ satisfying Equation 7 and the fourth connecting surface may be a curved surface, wherein the curved surface may have a minimum radius of curvature $r_4$ satisfying Equation 8:

$$\frac{c}{4} \le r_3 \le c \qquad \text{<Equation 7>}$$

$$0 \le r_4 \le \frac{3}{4}c \qquad \text{<Equation 8>}$$

where c denotes a distance between the first partition and the first side wall.

Within this range, the aerator can secure smooth air flow, thereby exhibiting high cleaning efficiency.

By way of another example, the third connecting surface may be a planar surface connecting the first partition to the lower surface, wherein a distance $x_5$ between the first partition and a point at which an extension of the first partition joins an extension of the lower surface may satisfy Equation 9, and a distance $x_6$ between the lower surface and the point may satisfy Equation 10.

The fourth connecting surface may be a planar surface connecting the lower surface to the first side wall, wherein a distance $x_7$ between the lower surface and a point at which an extension of the lower surface joins an extension of the first side wall may satisfy Equation 11, and a distance $x_8$ between the first side wall and the point may satisfy Equation 12.

$$\frac{c}{4} \leq x_5 \leq c \qquad \langle\text{Equation 9}\rangle$$

$$\frac{c}{4} \leq x_6 \leq c \qquad \langle\text{Equation 10}\rangle$$

$$0 \leq x_7 \leq \frac{3}{4}c \qquad \langle\text{Equation 11}\rangle$$

$$0 \leq x_8 \leq \frac{3}{4}c \qquad \langle\text{Equation 12}\rangle$$

where c denotes a distance between the first partition and the first side wall.

Within this range, the aerator can secure smooth air flow, thereby exhibiting high cleaning efficiency.

The housing may further include an inlet communicating with the first cavity.

The aerator holds a certain amount of air in the inner cavity and discharges the air at the same time, thereby exhibiting high cleaning efficiency. Specifically, when air is continuously supplied into the inner cavity of the aerator and an amount of air in the inner cavity is thus increased, the air rises to the upper portions of the first cavity 32 and the first chamber 36 of the second cavity 34, such that a level of a liquid in each of the first cavity 32 and the first chamber 36 is lowered. When the liquid level in the first chamber 36 is lower than the second lower end 54 of the second partition 50, the air flows from the first chamber 36 to the second chamber 38 through an opening under the second lower end 54 of the second partition 50. Then, the air ascends through the second chamber 38 and is discharged in the form of air bubbles through the outlet 62. Most of the air in the first chamber 36 and the first capacity portion 32 is discharged through the outlet 62 in a short time. Thus, the aerator according to the present invention can prevent creation of a vortex of air at corners of the air flow path and thus can secure smooth air flow, high bubble discharge speed, and continuous discharge of large bubbles, thereby exhibiting high cleaning efficiency.

Next, an aerator according to another embodiment of the present invention will be described with reference to FIGS. 7, 8, and 9. FIGS. 7, 8, and 9 are each a schematic perspective view of an aerator according to another embodiment of the present invention.

Referring to FIGS. 7, 8, and 9, the aerator 300, 400, or 500 may have at least two separated inner cavities. For uniform cleaning, the aerator with the separated inner cavities may include outlets aligned zigzag or perpendicularly with respective to a longitudinal direction of an air diffusion pipe.

The aerator 300, 400, or 500 having the plural cavities can generate plural large air bubbles, thereby exhibiting further improved membrane cleaning efficiency.

Air Diffuser

Another aspect of the present invention relates to an air diffuser. The air diffuser may include the aerator as set forth above and an air diffusion pipe which discharges the air through an air diffusion hole.

Referring to FIG. 10, the air diffusion pipe 100 serves to supply air to the inner cavity of the aerator. Specifically, the air diffusion pipe 100 may include a plurality of air diffusion holes through which air is supplied to the inner cavity.

The aerator holds a certain amount of air in the inner cavity and discharges the air at the same time, thereby exhibiting improved cleaning efficiency. The aerator is substantially the same as the aerator according to the present invention. Although the aerator 300 is shown as including a curved surface in cross-section and having 5 separated inner cavities in FIG. 10, it should be understood that the present invention is not limited thereto.

Next, the air diffusion pipe will be described in detail.

The air diffusion pipe 100 may include any suitable air diffusion pipe for supplying air to the aerator. For example, the air diffusion pipe 100 may include an inlet through which air is introduced into the air diffusion pipe and a plurality of air diffusion holes formed in a longitudinal direction of the air diffusion pipe to allow air discharged to the inner cavities therethrough. The air diffusion pipe 100 may have a tubular shape, without being limited thereto.

The air diffusion pipe 100 may have a circular, elliptical, track-like, triangular, polygonal, or polygonal shape with rounded corners in cross-section. Specifically, the air diffusion pipe 100 may have a circular shape in cross-section in consideration of smooth air flow, without being limited thereto. In addition, the air diffusion pipe 100 may have various cross-sectional shapes and various cross-sectional areas. The air diffusion pipe 100 may include a circular cross-section which has advantages in uniform distribution of the air pressure and prevention of sludge accumulation.

The air diffusion pipe 100 may include a plurality of air diffusion holes through which air is discharged to the inner cavity, wherein the air diffusion holes may be formed in the longitudinal direction of the air diffusion pipe 100. In addition, the air diffusion holes may be formed on both sides of the air diffusion pipe 100. Here, the air diffusion holes on both sides may be alternately formed in a zigzag pattern, or may be formed symmetrical to one another with respect to the longitudinal direction, without being limited thereto. Each of the air diffusion holes may have a circular, elliptical, stellate, track-like, triangular, polygonal, or polygonal shape with rounded corners. Specifically, the air diffusion hole may have a circular shape in consideration of air resistance, without being limited thereto.

In the air diffuser, the air diffusion pipe 100 may be located in the first cavity 32 of the housing such that air discharged through the air diffusion hole can sequentially pass through the first cavity 32, the first chamber 36, and the second chamber 38 before being discharged through the outlet.

The aerator may further include an inlet communicating with the first cavity, such that the air diffusion pipe is inserted into the aerator through the inlet. Although the air diffusion pipe is shown as inserted into the aerator through the inlet in FIG. 10, it should be understood that the present invention is not limited thereto. For example, the air diffusion pipe may be placed under the aerator with an open bottom to supply air to the aerator.

MODE FOR INVENTION

Next, the present invention will be described in more detail with reference to some examples. It should be understood that these examples are provided for illustration only and are not to be in any way construed as limiting the present invention. In addition, descriptions of details apparent to those skilled in the art will be omitted for clarity.

EXAMPLE

Example 1

An aerator including a housing (57 mm×100 mm×180 mm, distance between the first side wall and the second side wall: 51 mm) was fabricated in which the first connecting surface and the second connecting surface were planar and the third connecting surface was curved. Specifically, the aerator had an inner cavity in which the distance a between the first side wall and the first partition was 29 mm, the distance b between the first partition and the second partition was 10 mm, the distance c between the first partition and the second side wall was 19 mm, $x_1$ was 29 mm (1 time the value of a), $x_2$ was 22 mm (¾ times the value of a), $x_3$ was 8 mm (¾ times the value of b), $x_4$ was 7 mm (⅔ times the value of b), $r_3$ was 13 mm (⅔ times the value of c), and $r_4$ was 0 mm (0 times the value of c).

Example 2

An aerator including a housing (100 mm×54 mm×180 mm, distance between the first side wall and the second side wall: 94 mm) was fabricated in which the first connecting surface, the second connecting surface, the third connecting surface, and the fourth connecting surface were curved. Specifically, the aerator had an inner cavity in which the distance a between the first side wall and the first partition was 72 mm, the distance b between the first partition and the second partition was 10 mm, the distance c between the first partition and the second side wall was 19 mm, $r_1$ was 48 mm (⅔ times the value of a), $r_2$ was 10 mm (1 time the value of b), $r_3$ was 13 mm (⅔ times the value of c), and $r_4$ was 6 mm (⅓ times the value of c).

Comparative Example 1

An aerator was fabricated which included a housing (56 mm×100 mm×180 mm, distance between the first side wall and the second side wall: 50 mm) and had an inner cavity (distance a between the first side wall and the first partition: 28 mm, distance b between the first partition and the second partition: 10 mm, distance c between the first partition and the second side wall: 19 mm).

Property Evaluation

Each of the aerators fabricated in Examples and Comparative Example was dipped in a transparent acrylic water tank having a height of 50 cm or more and filled with water and then the discharge cycle of large bubbles through an outlet (unit: sec), the time required for discharge of large bubbles (unit: sec), the total volume of large bubbles discharged at a time (unit: cm$^3$), and the discharge rate of large bubbles through the outlet (unit: m/sec) were each measured 5 times while supplying air to the inner cavity of the aerator at a rate of 7.5 L/min, followed by averaging the measured values. Results are shown in Table 1. Here, the internal effective volume (cm$^3$) of each aerator was calculated based on the aforementioned internal dimensions, and the discharged bubbles were collected in a 500 ml beaker to measure the total volume thereof. In addition, the total volume of large bubbles discharged at a time refers to the total volume of large bubbles discharged for 1 discharge cycle, and micro-bubbles discharged after discharge of large bubbles were not taken into account.

TABLE 1

| Item | Effective volume of aerator (cm$^3$) | Discharge cycle (sec) | Time required for discharge of large bubbles (sec) | Total volume of large bubbles at a time (cm$^3$) | Discharge rate of large bubbles (m/sec) |
|---|---|---|---|---|---|
| Example 1 | 464 | 4.35 | 0.61 | 400 | 2.73 |
| Example 2 | 465 | 4.29 | 0.54 | 410 | 3.16 |
| Comparative Example 1 | 463 | 4.40 | 0.77 | 370 | 1.98 |

As shown in Table 1, the aerator fabricated in accordance with the specific structure of the present invention prevents air voltices, thereby preventing large bubbles from being broken into micro-bubbles while the air being discharged, and, with the increased speed of bubble discharging rate due to smooth air flow, exhibits high cleaning efficiency via high energy level of discharged bubbles.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

The invention claimed is:
1. An aerator comprising:
   a housing having an inner cavity and comprising at least one side wall and an upper surface connected to the at least one side wall;
   a first partition formed in the inner cavity and extending from a first lower end to a first upper end to define a first cavity and a second cavity; and
   a second partition formed between the first partition and a first side wall in the inner cavity and extending from a second upper end to a second lower end to form a first chamber and a second chamber in the second cavity,
   wherein the housing comprises an outlet communicating with the second chamber, the first upper end of the first partition is spaced apart from the upper surface to form a first opening such that the first cavity communicates with the second cavity through the first opening, the at least one side wall comprises the first side wall and a second side wall opposite the first side wall, the first lower end of the first partition is connected to the first side wall through a lower surface, the second side wall is connected to the upper surface through a first connecting surface, the second partition is connected to the upper surface through a second connecting surface, the first chamber and the second chamber communicate with each other under the second lower end of the second partition, and at least one of the first connecting surface and the second connecting surface is a planar surface, a curved surface, or a polygonal surface.

2. The aerator according to claim 1, wherein the first connecting surface is a curved surface, and the curved surface has a minimum radius of curvature $r_1$ satisfying Equation 1:

$$\frac{a}{4} \leq r_1 \leq a$$

where a denotes a distance between the second side wall and the first partition.

3. The aerator according to claim 1, wherein the second connecting surface is a curved surface, the curved surface has a minimum radius of curvature $r_2$ satisfying Equation 2:

$$\frac{b}{3} \leq r_2 \leq b$$

where b denotes a distance between the first partition and the second partition.

4. The aerator according to claim 1, wherein at least one of the first connecting surface and the second connecting surface is a polygonal surface.

5. The aerator according to claim 1, wherein the first connecting surface is a planar surface connecting the second side wall to the upper surface, a distance $x_1$ between the second side wall and a point at which an extension of the second side wall joins an extension of the upper surface satisfies Equation 3, and a distance $x_2$ between the upper surface and the point satisfies Equation 4:

$$\frac{a}{4} \leq x_1 \leq a \quad \langle\text{Equation 3}\rangle$$

$$\frac{a}{4} \leq x_2 \leq a \quad \langle\text{Equation 4}\rangle$$

where a is a distance between the second side wall and the first partition.

6. The aerator according to claim 1, wherein the second connecting surface is a planar surface connecting the upper surface to the second partition, a distance $x_3$ between the upper surface and a point at which an extension of the upper surface joins an extension of the second partition satisfies Equation 5, and a distance $x_4$ between the second partition and the point satisfies Equation 6:

$$\frac{b}{3} \leq x_3 \leq b \quad \langle\text{Equation 5}\rangle$$

$$\frac{b}{3} \leq x_4 \leq b \quad \langle\text{Equation 6}\rangle$$

where b denotes a distance between the first partition and the second partition.

7. The aerator according to claim 1, wherein the first partition is connected to the lower surface through a third connecting surface, the lower surface is connected to the first side wall through a fourth connecting surface, and at least one of the third connecting surface and the fourth connecting surface is a planar surface, a curved surface, or a polygonal surface.

8. The aerator according to claim 7, wherein the third connecting surface is a curved surface comprising a minimum radius of curvature $r_3$ satisfying Equation 7, and the fourth connecting surface is a curved surface comprising a minimum radius of curvature $r_4$ satisfying Equation 8:

$$\frac{c}{4} \leq r_3 \leq c \quad \langle\text{Equation 7}\rangle$$

$$0 \leq r_4 \leq \frac{3}{4}c \quad \langle\text{Equation 8}\rangle$$

where c denotes a distance between the first partition and the first side wall.

9. The aerator according to claim 7, wherein the third connecting surface is a planar surface connecting the first partition to the lower surface; a distance $x_5$ between the first partition and a point at which an extension of the first partition joins an extension of the lower surface satisfies Equation 9; a distance $x_6$ between the lower surface and the point satisfies Equation 10; the fourth connecting surface is a planar surface connecting the lower surface to the first side wall, a distance $x_7$ between the lower surface and a point at which an extension of the lower surface joins an extension of the first side wall satisfies Equation 11; and a distance $x_8$ between the first side wall and the point satisfies Equation 12:

$$\frac{c}{4} \leq x_5 \leq c \quad \langle\text{Equation 9}\rangle$$

$$\frac{c}{4} \leq x_6 \leq c \quad \langle\text{Equation 10}\rangle$$

$$0 \leq x_7 \leq \frac{3}{4}c \quad \langle\text{Equation 11}\rangle$$

$$0 \leq x_8 \leq \frac{3}{4}c \quad \langle\text{Equation 12}\rangle$$

where c denotes a distance between the first partition and the first side wall.

10. The aerator according to claim 1, wherein the housing further comprises an inlet communicating with the first cavity.

11. The aerator according to claim 1, wherein the aerator comprises the inner cavity separated into two or more.

12. An air diffuser comprising:
the aerator according to claim 1; and
an air diffusion pipe for discharging air through an air diffusion hole.

13. The air diffuser according to claim 12, wherein the air diffusion pipe is placed in the first cavity of the housing such that the air discharged through the air diffusion hole is discharged from the aerator through the outlet after sequentially passing through the first cavity, the first chamber, and the second chamber.

14. The air diffuser according to claim 12, wherein the aerator further comprises an inlet communicating with the first cavity, and the air diffusion pipe penetrates the aerator through the inlet.

* * * * *